US009709452B2

(12) United States Patent
Norian et al.

(10) Patent No.: US 9,709,452 B2
(45) Date of Patent: Jul. 18, 2017

(54) SYSTEMS AND METHODS FOR COMPENSATING A SENSOR

(71) Applicant: Kulite Semiconductor Products, Inc., Leonia, NJ (US)

(72) Inventors: Haig Norian, Fair Lawn, NJ (US); Louis DeRosa, Wayne, NJ (US); Joseph VanDeWeert, Maywood, NJ (US)

(73) Assignee: Kulite Semiconductor Products, Inc., Leonia, NJ (US)

( * ) Notice: Subject to any disclaimer, the term of this patent is extended or adjusted under 35 U.S.C. 154(b) by 378 days.

(21) Appl. No.: 14/528,203

(22) Filed: Oct. 30, 2014

(65) Prior Publication Data

US 2015/0114128 A1 Apr. 30, 2015

Related U.S. Application Data

(60) Provisional application No. 61/898,308, filed on Oct. 31, 2013.

(51) Int. Cl.
*G01L 19/04* (2006.01)
*G01L 9/06* (2006.01)

(52) U.S. Cl.
CPC .................... *G01L 9/065* (2013.01)

(58) Field of Classification Search
CPC G01L 19/04; G01L 9/065; G01L 7/00; G01N 3/12; E21B 21/08; G01F 1/74

USPC ................... 73/708, 700, 37, 152.22, 861.42
See application file for complete search history.

(56) References Cited

U.S. PATENT DOCUMENTS

| | | | | |
|---|---|---|---|---|
| 6,700,473 B2* | 3/2004 | Kurtz | ..................... | G01L 1/2281 338/42 |
| 6,877,379 B2* | 4/2005 | Kurtz | ..................... | G01L 9/065 73/708 |
| 7,733,209 B2* | 6/2010 | Kurtz | ..................... | G01L 9/0055 338/2 |

* cited by examiner

*Primary Examiner* — Michael A Lyons
*Assistant Examiner* — Nigel Plumb
(74) *Attorney, Agent, or Firm* — Troutman Sanders LLP; James E. Schutz; Mark Lehi Jones (57) ABSTRACT

Systems, methods, and apparatus for compensation of a sensor are presented. A method is provided that includes determining a response of a sensor. For example, a temperature response of a pressure sensor may be characterized. In an example implementation, the sensor may be coupled to one or more input terminals, for example, that are configured for connecting to an input voltage source. The sensor may also be coupled to one or more configurable resistor networks. The sensor may further be coupled to one or more output terminals configured for providing an output signal. The method further includes determining one or more compensation resistance values for compensating the determined response of the sensor. The method includes selectively configuring, based at least in part on determining the one or more compensation resistance values, the one or more configurable resistor networks for compensating the response of the sensor.

20 Claims, 8 Drawing Sheets

SYSTEMS AND METHODS FOR COMPENSATING A SENSOR

CROSS-REFERENCE TO RELATED APPLICATIONS

This application claims priority to U.S. Provisional Patent Application Ser. No. 61/898,308, entitled: "Systems and Methods for Compensating a Sensor," filed Oct. 31, 2013, the contents of which are incorporated by reference in their entirety as if fully set forth herein.

FIELD

This invention relates to sensors and more particularly to systems and methods for compensating a sensor.

BACKGROUND

Pressure sensors have been fabricated for operation over a broad range of environmental conditions. In such sensors, piezoresistors coupled to a diaphragm may be used to measure a pressure. The piezoresistors may be conventionally arranged as a Wheatstone bridge. Upon the application of pressure, the sensor's diaphragm deflects slightly which induces strain onto the piezoresistors. The piezoresistors respond to this strain by a change of resistance. The Wheatstone bridge configuration typically includes four piezoresistors that are arranged on the diaphragm such that two piezoresistors are put in tension while the other two piezoresistors are placed in compression. This way, two piezoresistors increase in value, while the other two piezoresistors decrease in value by the same or similar amount. By connecting the piezoresistors under tension on opposite arms of the Wheatstone bridge, and by similarly connecting the piezoresistors under compression on the other opposite arms of the Wheatstone bridge, the output of the Wheatstone bridge can produce a voltage which is proportional to the applied pressure. For high temperature operations, as indicated, the diaphragm may be a metal diaphragm. For example, see U.S. Pat. No. 7,733,209 to Kurtz et al, entitled "High Temperature Pressure Transducer Employing Metal Diaphragm," filed Jun. 15, 2006, and assigned to Kulite Semiconductor Products, Inc., the assignee herein. The specification of said U.S. Pat. No. 7,733,209 describes a sensor utilizing a metal diaphragm and piezoresistors, with a ratio known as the transducer sensitivity given by the following equation:

$$S = \frac{1}{P}\frac{V_{out}}{V_B},$$

where S is sensitivity, P is applied pressure, $V_{OUT}$ is output voltage, and $V_B$ is voltage applied to the bridge.

It is highly desirable that the output of the pressure sensor is sensitive only to pressure and is not affected by other environmental factors. A notable factor is temperature and therefore the sensitivity of the pressure sensor should be independent of temperature. Many factors affect the sensitivity of a particular sensor, including geometric, physical, and electrical factors. Unfortunately some of these factors are indeed temperature dependant which leads directly to temperature variation in the sensitivity. Various schemes must then be utilized to minimize this temperature variation of the sensitivity. These schemes are collectively known as temperature compensation. As one will ascertain, the prior art is replete with a number of temperature compensation methods. See for example U.S. Pat. No. 6,877,379 issued on Apr. 12, 2005 and entitled Doubly Compensated Pressure Transducer issued to Dr. Anthony D. Kurtz et al and assigned to the assignee herein. That patent describes a compensated pressure transducer which has coarse and fine temperature compensation. See also U.S. Pat. No. 6,700,473 issued on Mar. 2, 2004 entitled Pressure Transducer Employing On-Chip Resistor Compensation to Dr. Anthony D. Kurtz, et al and assigned to the assignee herein. That patent describes a technique for compensating temperature in a pressure sensor. Thus, as one will ascertain, there are many techniques described in the prior art to provide compensation of pressure sensors for temperature. However there still exists a need for improved temperature compensation in pressure sensors.

BRIEF SUMMARY

Systems, methods, and apparatus for compensation of a sensor are presented herein in accordance with certain example implementations of the disclosed technology.

In one example implementation, a method is provided that includes determining a response of a sensor. For example, a temperature response of a pressure sensor may be characterized. In an example implementation, the sensor may be coupled to one or more input terminals, for example, that are configured for connecting to an input voltage source. The sensor may also be coupled to one or more configurable resistor networks. The sensor may further be coupled to one or more output terminals configured for providing an output signal. The method further includes determining one or more compensation resistance values for compensating the determined response of the sensor. The method includes selectively configuring, based at least in part on determining the one or more compensation resistance values, the one or more configurable resistor networks for compensating the response of the sensor.

In another example implementation, a compensation system is provided. The system includes a sensor, one or more input terminals in communication with the sensor and configured for connecting to an input voltage source, one or more output terminals in communication with the sensor and configured for providing an output signal, and one or more configurable resistor networks in communication with one or more of the input and output terminals. The one or more configurable resistor networks include one or more resistors configured to provide a compensation resistance value to compensate for a responses of the sensor.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

The disclosed technology is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION

The following detailed description is merely illustrative in nature and is not intended to limit the disclosure or the application and uses of the disclosed technology. Furthermore, there is no intention to be bound by any expressed or implied theory presented in the preceding field of use, background, or summary of the disclosure or the following detailed description. This disclosure provides various examples, embodiments and the like, which may be described herein in terms of functional or logical block elements. Various techniques described herein may be applied for compensation of a sensor. The various aspects described herein are presented as methods, devices (or apparatus), and systems that may include a number of components, elements, members, modules, nodes, peripherals, or the like. Further, these methods, devices, and systems may include or not include additional components, elements, members, modules, nodes, peripherals, or the like.

Figure 1:
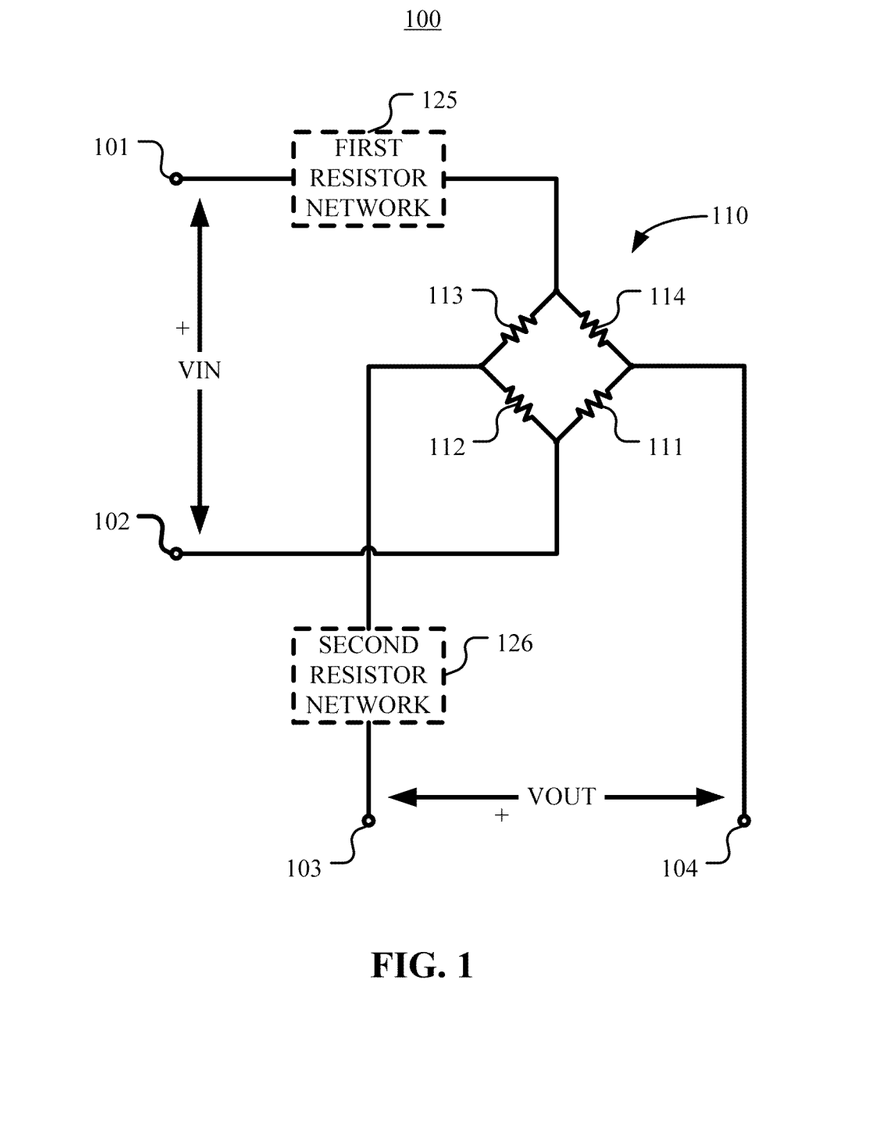
FIG. 1 illustrates one embodiment of a system for compensation of a sensor with various aspects described herein.

FIG. 1 illustrates one embodiment of a system 100 for compensation of a sensor 110 with various aspects described herein. In FIG. 1, the system 100 may be configured to include the sensor 110 and at least one of a first resistor network 125 and a second resistor network 126. The sensor 110 may include piezoresistors 111 112 113 114, which may be configured as a Wheatstone bridge. An input voltage may be applied to the system 100 using input terminals 101 and 102. Further, an output voltage may be output from the system 100 using the output terminals 103 and 104.

In one embodiment, the system 100 may include the sensor 100 and the first resistor network 125. The first resistor network 125 may be operationally coupled to the input terminal 101 and the sensor 110. In such configuration, the first resistor network 125 may be used to compensate the sensor 110 for temperature, humidity, pressure, another environmental condition, or the like.

In another embodiment, the system 100 may include the sensor 100 and the second resistor network 126. The second resistor network 126 may be operationally coupled to the output terminal 103 and the sensor 110. In such configuration, the second resistor network 126 may be used to compensate the sensor 110 for temperature, humidity, pressure, another environmental condition, or the like.

In another embodiment, the system 100 may include the sensor 100 and the first resistor network 125 and the second resistor network 126. The first resistor network 125 may be operationally coupled to the input terminal 101 and the sensor 110. Further, the second resistor network 126 may be operationally coupled to the output terminal 103 and the sensor 110. In such configuration, the first resistor network 125 and the second resistor network 126 may be used to compensate the sensor 110 for temperature, humidity, pressure, another environmental condition, or the like.

According to an example implementation, one or more of the resistive networks 125 126 may include low temperature coefficient (TC) resistors that may be configured after assembly or partial assembly of the system 100. For example, in one embodiment, one or more of the resistors associated with the compensating network(s) may be laser trimmable to adjust or refine its value (as will be explained with reference to FIG. 5).

Figure 6A:
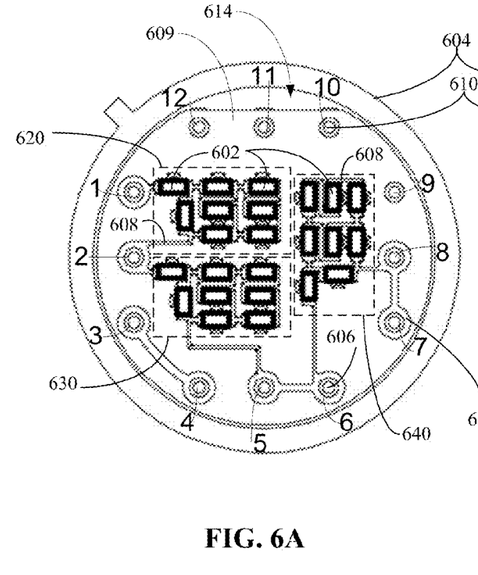
FIG. 6A illustrates a top-view of an example packaged resistor network having configurable connections, according to an example implementation of the disclosed technology.
Figure 6B:
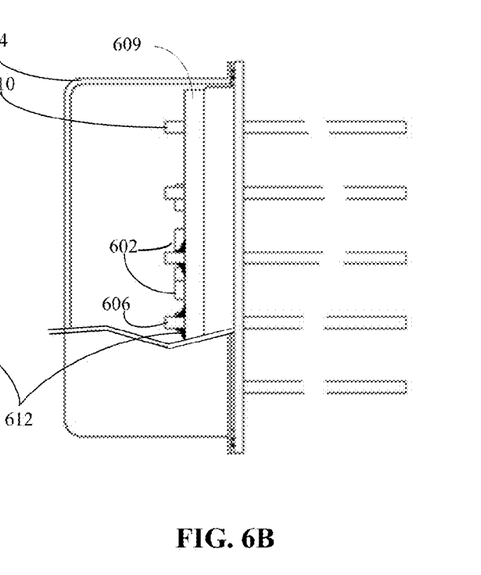
FIG. 6B illustrates a side-view of the example packaged resistor network, as shown in FIG. 6A.

In another example implementation (and as will be explained with reference to FIG. 6 and FIG. 7), the compensating network(s) may be configurable by opening certain electrical connections or traces between compensating resistors that are arranged in a series/parallel electrical configuration. In this implementation, specific traces may be opened using focused laser light. In certain other example implementations, traces may be opened using removable solder bridges. In yet other example implementations, specific traces may be opened using mechanical means, such as a blade. In some example implementations, certain connection(s) among the resistive networks may be configured (opened) then specific resistors may be trimmed to fine tune the compensating network(s).

Figure 2:
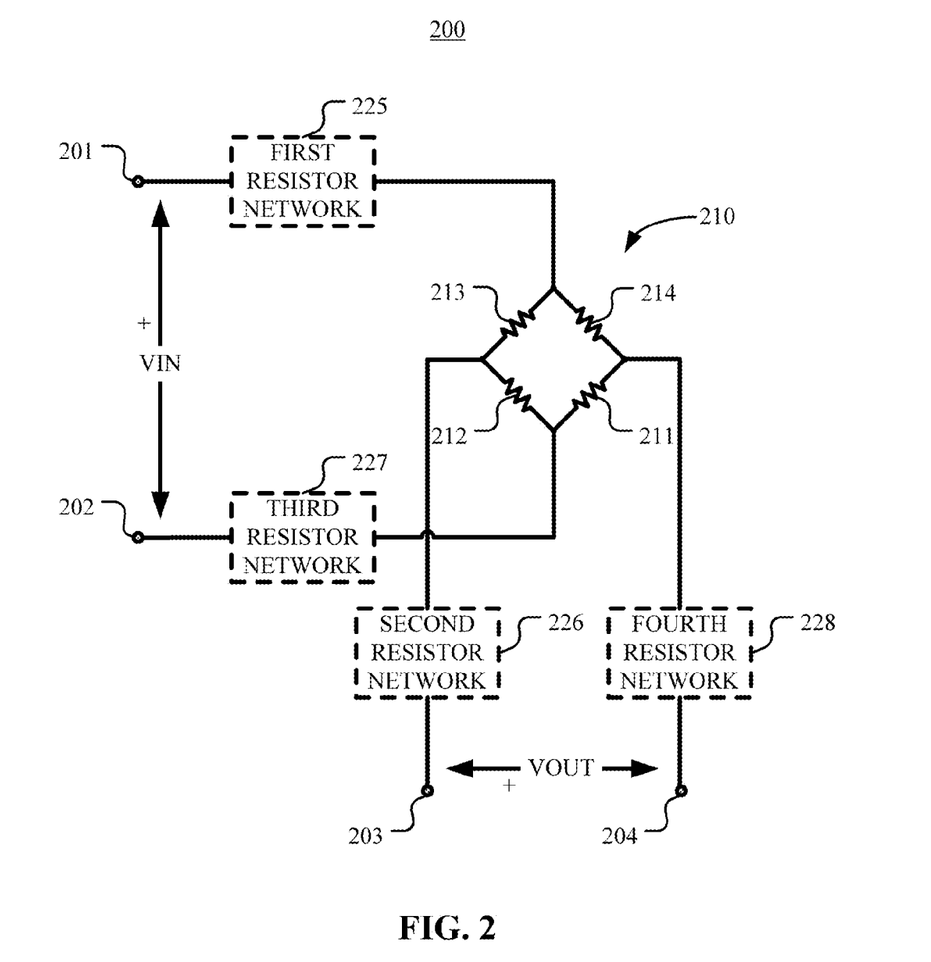
FIG. 2 illustrates another embodiment of a system for compensation of a sensor with various aspects described herein.

FIG. 2 illustrates another embodiment of a system 200 for compensation of a sensor 210 in accordance with various aspects described herein. In FIG. 2, the system 200 may be configured to include the sensor 210 and at least one of a first resistor network 225, a second resistor network 226, a third resistor network 227 and a fourth resistor network 228. The sensor 210 may include piezoresistors 211 to 214, which may be configured as a Wheatstone bridge. Each of the first resistor network 225, the second resistor network 226, the third resistor network 227 and the fourth resistor network 228 may be used to compensate the sensor 210 for temperature, humidity, pressure, another environmental condition, or the like. Further, each of the first resistor network 225, the second resistor network 226, the third resistor network 227 and the fourth resistor network 228 may include low temperature coefficient (TC) resistors that may be laser trimmable and/or configured by opening particular traces (as explained above with reference to FIG. 1). An input voltage may be applied to the system 200 using input terminals 201 and 202. Further, an output voltage may be output from the system 200 using the output terminals 203 and 204.

In one embodiment, the system 200 may include the sensor 200 and the first resistor network 225 and the third resistor network 227. The first resistor network 225 may be operationally coupled to the input terminal 201 and the sensor 210. The third resistor network 227 may be operationally coupled to the input terminal 202 and the sensor 210. In such configuration, the first resistor network 225 and the third resistor network 227 may be used to compensate the sensor 210 for temperature, humidity, pressure, another environmental condition, or the like.

In another embodiment, the system 200 may include the sensor 200 and the second resistor network 226 and the fourth resistor network 228. The second resistor network 226 may be operationally coupled to the output terminal 203 and the sensor 210. The fourth resistor network 228 may be operationally coupled to the output terminal 204 and the sensor 210. In such configuration, the second resistor networks 226 and the fourth resistor network 228 may be used to compensate the sensor 210 for temperature, humidity, pressure, another environmental condition, or the like.

In another embodiment, the system 200 may include the sensor 200 and the resistor networks 225 to 228. The first resistor network 225 may be operationally coupled to the input terminal 201 and the sensor 210. The third resistor network 227 may be operationally coupled to the input terminal 202 and the sensor 210. The second resistor network 226 may be operationally coupled to the output terminal 203 and the sensor 210. The fourth resistor network 228 may be operationally coupled to the output terminal 204 and the sensor 210. In such configuration, the first resistor network 225, the second resistor network 226, the third resistor network 227 and the fourth resistor network 228 may be used to compensate the sensor 210 for temperature, humidity, pressure, another environmental condition, or the like.

Figure 3A:
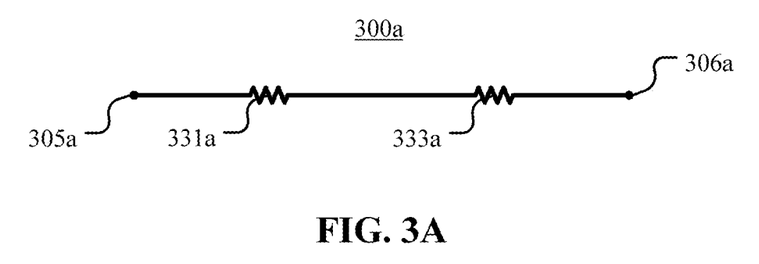
FIG. 3A illustrates an example embodiment of resistor networks for compensation of a sensor, according to various aspects described herein.
Figure 3B:
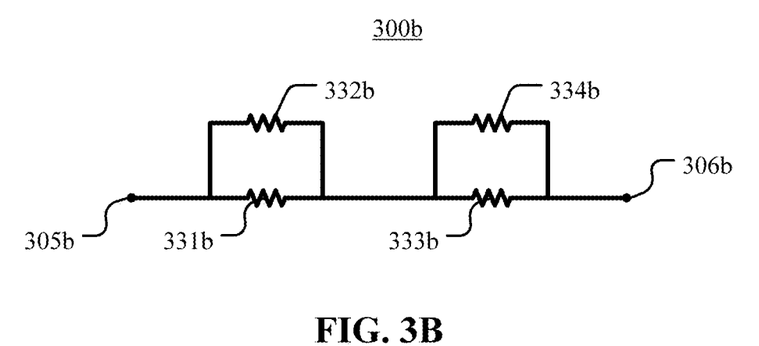
FIG. 3B illustrates another example embodiment of resistor networks for compensation of a sensor, according to various aspects described herein.

FIGS. 3A and 3B illustrate example embodiments of respective resistor networks 300a and 300b for compensation of a sensor, according to example implementations of the disclosed technology. In FIG. 3A, a resistor network 300a may be configured to include resistors 331a and 333a. In one example, the resistors 331a and 333a may be in series. In another example, the resistors 331a and 333a may be in parallel. In certain example implementations, one or more of the resistors 331a and 333a may be laser trimmable. In certain example implementations, the connections between, around, and/or among the resistors may be configurable, as previously described.

In FIG. 3B, a resistor network 300b may be configured to include resistors 331b, 332b, 333b, 334b. In one example, resistors 331b and 332b operating in parallel may be in series with resistors 333b and 334b operating in parallel. A person of ordinary skill in the art will recognize various configurations for resistor networks. Each of the resistors 331b to 334b may be laser trimmable. In certain example implementations, the connections between, around, and/or among the resistors 331b, 332b, 333b, 334b may be configurable by opening said connections, as previously described.

Figure 4:
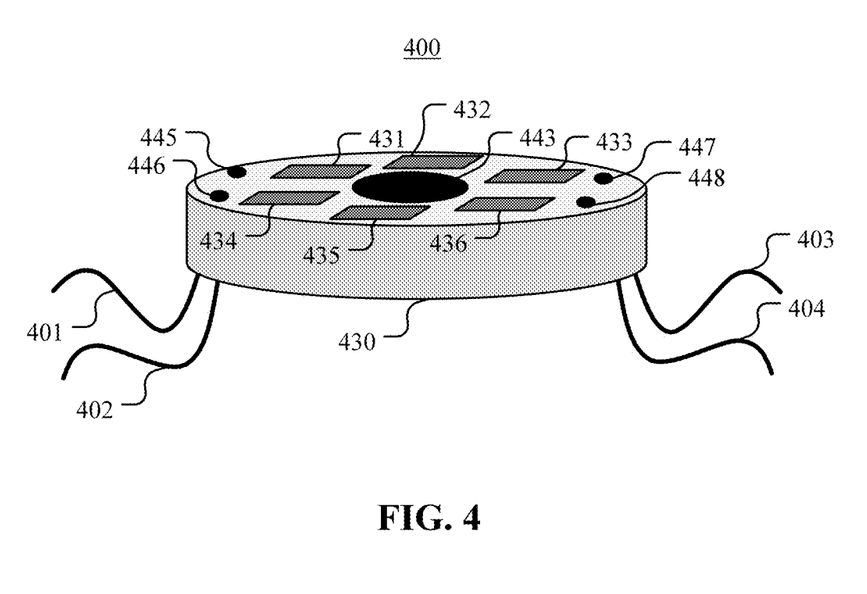
FIG. 4 illustrates an example embodiment of a sensor and an associated resistor network for compensation of a sensor, according to various aspects described herein.

FIG. 4 illustrates one embodiment of a resistor network 400 for compensation of a sensor, in accordance with an example implementation of the disclosed technology. In FIG. 4, the resistor network 400 may be configured to include a substrate 430, one or more resistors 431, 432, 433, 434, 435, 436, 436, input terminals including a first lead 401 and a second lead 402, and output terminals including a third lead 403 and a fourth lead 404. In one example, the substrate 430 may be a ceramic substrate. In another example, the substrate 430 may be a custom-shaped substrate. In one example, the substrate 430 may be configured to include an opening 432 in the substrate 430 to allow access to a sensor. According to an example implementation of the disclosed technology, each of the resistors 431 to 436 may be used to compensate a sensor for temperature, humidity, pressure, another environmental condition, or the like.

In accordance with an example implementation of the disclosed technology, one or more of the resistors 431 432 433 434 435 436 may be laser trimmed and/or configured by opening circuit connection to allow for a reduced error between a measured value by the sensor and the actual value of the environmental condition. In an example implementation, one or more of the resistors 431-436 in the compensation network may be trimmed or configured, for example, during operation of the system to provide more accurate compensation. Further, active monitoring of resistance may be done during the trimming or circuit configuring process to provide a closer match between a desired resistor value and an implemented resistor value.

In an example implementation, each of the input terminal leads 401 402 and output terminal leads 403 404 may be electrical leads, which may be routed to a sensor using wires or other conductors, as know to those of skill in the art. Alternatively, the resistor network 400 may be directly mounted onto a sensor or sensor substrate, for example, with electrical trace connections established between sensor and the various resistors 431 to 436 without requiring the separate electrical leads 401 402 403 or 404. The substrate 430, for example, may be configured to include a first opening 443 to allow access to a sensor (not shown). Further, a second opening 445, a third opening 446, a fourth opening 447 and a fifth opening 448 may be used to allow, for instance, routing of electrical leads 401 402 403 or 404 to or from the substrate 430.

Figure 5:
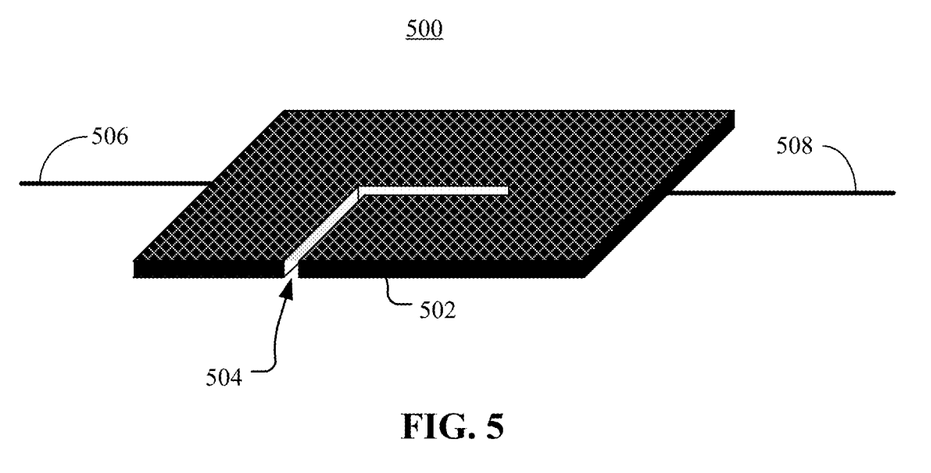
FIG. 5 illustrates an example embodiment of a trimmable resistor for use in a compensation network, in accordance with various aspects described herein.

FIG. 5 illustrates an example embodiment of a trimmable resistor 500 having an L-cut trim according to certain example implementations of the disclosed technology. In FIG. 5, the trimmable resistor 500 may include a region of resistive material 502 that may be trimmed to vary the resistance between its edges or leads 506 508. For example, one or more portions 504 of the resistive material 502 may be removed, trimmed, or otherwise cut to increase the resistance of the trimmable resistor 500. In one example, a laser may be used to produce the trimmed portion 504. In one example implementation, the trimmed portion 504 of resistive material may be may be removed to increase the component resistance. According to an example implementation of the disclosed technology, the trimmable resistor 500 may be a low-temperature coefficient (low-TC) resistor.

As is known to those having skill in the art, removing one or more portions 504 of resistive material 502 from a planar trimmable resistor 500 (as shown in FIG. 5) increases the bulk resistance as measured between the edges or leads 506 508. Thus, in accordance with certain example implementations of the disclosed technology, the resistors may be initially fabricated to have a slightly lower resistance value so that, upon trimming, the desired resistance may be achieved.

FIG. 5 depicts the removal of one or more portions 504 of resistive material 502 from a planar trimmable resistor 500 where the trimmed portion 504 extends all the way through the thickness of the trimmable resistor 500. However, in certain other implementations of the disclosed technology, it may not be necessary for the trimmed portion 504 to extend all the way through the thickness of the resistive material 502. According to certain example implementations, the removal of the resistive material 502 may be done under active conditions, i.e., while the resistor 500 is being actively measured.

According to an example implementation of the disclosed technology, the trimmable resistor 500 may be printed and cured. In another example implementation, the resistor 500 may be an individual component that can be attached (soldered, etc.,) using standard pick-and-place assembly techniques. During the trimming process, a number of factors can affect the final value of the device resistance. A laser trimming process, for example, may be utilized to raise the resistance of the resistor. The final resistance accuracy may be may require control of several laser parameters. For example, the laser parameters may include the speed of the beam movement, the beam diameter, laser beam focal point, pulse rate (Q-switching rate), and the laser pulse power, the dwell time, the length of the trim, the width of the trim, etc. Additionally, probing methods, such as full or partial Kelvin probes may be utilized to monitor the resistance value during trimming.

Another approach may be utilized for setting and/or refining resistance values for use in a compensation circuit, according to certain examples of the disclosed technology, and will be explained below with reference to FIG. 6A, FIG. 6B and FIG. 7.

FIG. 6A illustrates a top-view of an example packaged resistor network, according to an example implementation of the disclosed technology. FIG. 6B illustrates a partially cutaway side-view of the example packaged resistor network, as shown in FIG. 6A. FIG. 7 depicts an example circuit diagram of series/parallel resistor networks having configurable connections 608 that may be utilized in an example implementation of the packaged resistor network.

Referring again to FIG. 6A, this figure depicts an example packaging implementation for physically mounting and electrically connecting resistors 602 in one or more resistor arrays 620 630 640. The individual resistors 602 in the one or more resistor arrays 620 630 640 may be connected using configurable connections 608 having series/parallel connections 608. In certain example implementations, the configurable connections 608 may include removable circuit traces. For example, certain configurable connections 608 among and/or between the resistors 602, or shorting around the resistors 602, may be removed or opened, for example, by laser or other means, to set desired resistance values for the compensation circuit.

FIGS. 6A and 6B depict an example package housing 604 having 12 pins 608 610 used, for example, to connect to the one or more resistor arrays 620 630 640 and/or to provide electrical and/or mechanical connections for the arrays with a sensor. In this example embodiment, pins 1-8 606 may be soldered 612 or otherwise electrically connected to traces on the top surface of the circuit substrate 609. In one example implementation, pins 9-12 610 may be extra pins and may provide mechanical means for mounting the package housing 604 to an external circuit board. In another example implementation, pins 9-12 610 may be connected to traces on the bottom surface (not shown) of the circuit substrate 609, for example, and may provide additional electrical connections to/from the one or more resistor arrays 620 630 640.

In an example implementation, the substrate 609 may be made from ceramic. In other example implementations, the substrate 609 may include one or more of fiberglass, PTFE, FR-4, hydrocarbon, ceramic, glass, etc.

According to an example implementation of the disclosed technology, the substrate 609 may include an opening portion 614 to allow access for one or more piezoresistive pressure sensors. In certain example implementations, resistors 602 mounted on the surface of the substrate 609 may be used to compensate for temperature or other effects associated with the piezoresistive sensing elements. In certain example implementations, the resistive elements may be configured to allow for lower percent error between the desired value for the temperature compensation resistance and the physical implementation.

Figure 7:
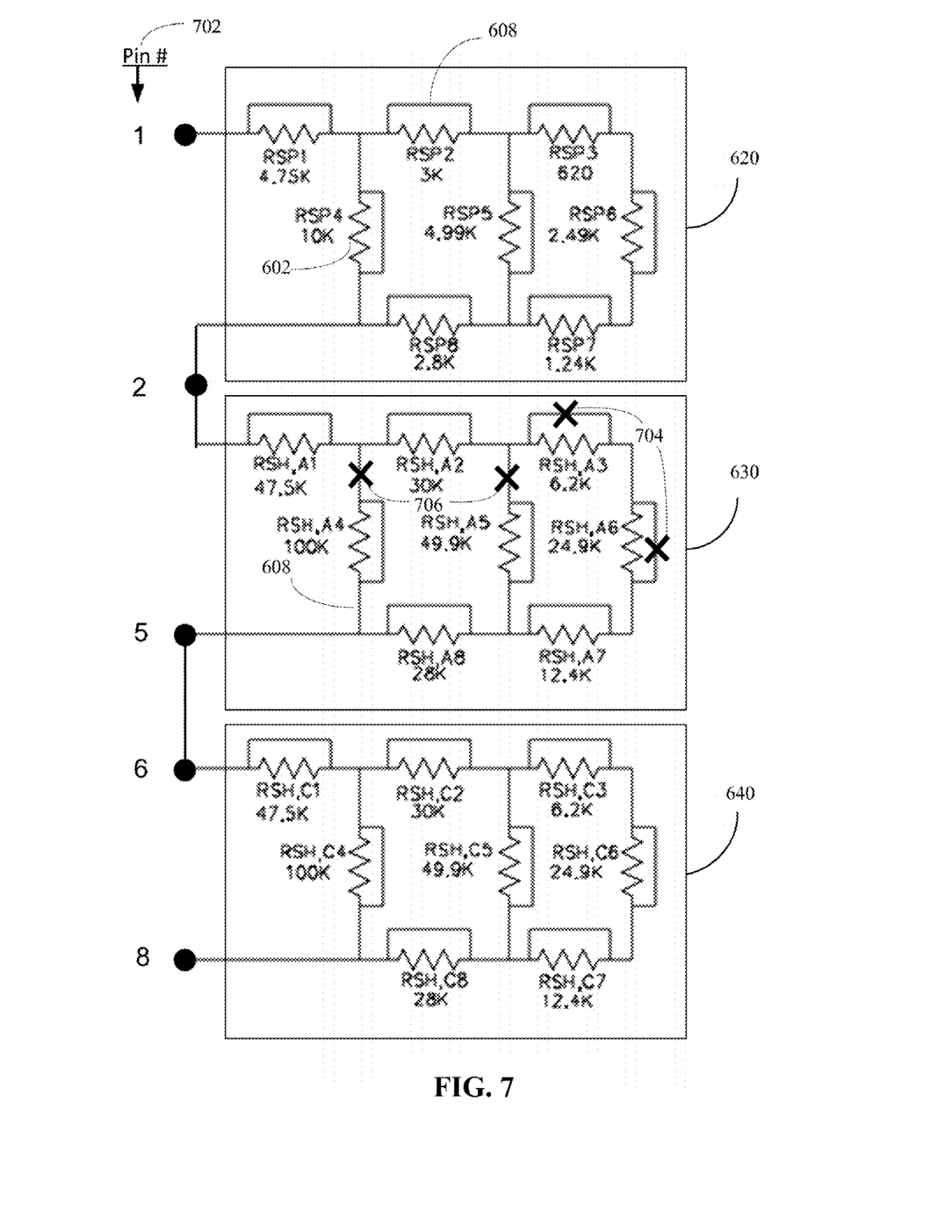
FIG. 7 depicts an example circuit diagram of series/parallel resistor networks having configurable connections.

FIG. 7 depicts an example arrangement of resistor arrays 620 630 640 having various configurable connections 608 among and/or between the resistors 602. Pin number connections 702 are shown that may correspond to the pins 606 1, 2, 5, 6, and 8 as shown in FIG. 6A. In this example, the middle resistor array 630 is depicted having cuts 704 to remove trace shorts around two respective resistors 602 (labeled as RSH.A3 and RSH.A6). Additional cuts 706 are shown across two resistors 602 (labeled RSH.A4 and RSH.A5) to disconnect the respective parallel branches in the configurable connections 608. In this particular example, the resulting cuts 704 706 provide a resistance of about 31.1 k ohms (6.2 K+24.9 k ohms) between pins 702 1 and 8.

In accordance with other example implementations of the disclosed technology, various combinations of cuts may be made in the configurable connections 608 to provide series and/or parallel resistor combinations, resulting in a range of resistance values between pins 702 1 and 8. Using the layout and resistance values shown in FIG. 7, the resulting resistance may be set to between about 0 ohms and about 313.06 k ohms (15.06 k ohms max from the top resistor array 620, +149 k ohms from the middle resistor array 620, +149 k ohms from the middle resistor array 620). In one example implementation using the values shown in FIG. 7, the maximum resistance of about 313.06 k ohms may be set between pins 702 1 and 8 by opening the two left most parallel (vertical) branches in each of the resistor arrays 620 630 640 and by removing all of the shorts around the rest of the series resistors.

It should be recognized that the resistor 602 values indicated in FIG. 7 provide for a given range of resistance values for compensation. In accordance with certain other example implementations, the values of the resistors 602 may be modified, scaled, etc. to provide for other ranges and/or configurable tolerances as needed. Further, the circuit traces between certain pins (for example, the circuit trace between pins 5 and 6) may be left connected or severed (and routed as needed) to provide a single compensation network or two compensation networks respectively.

Figure 8:
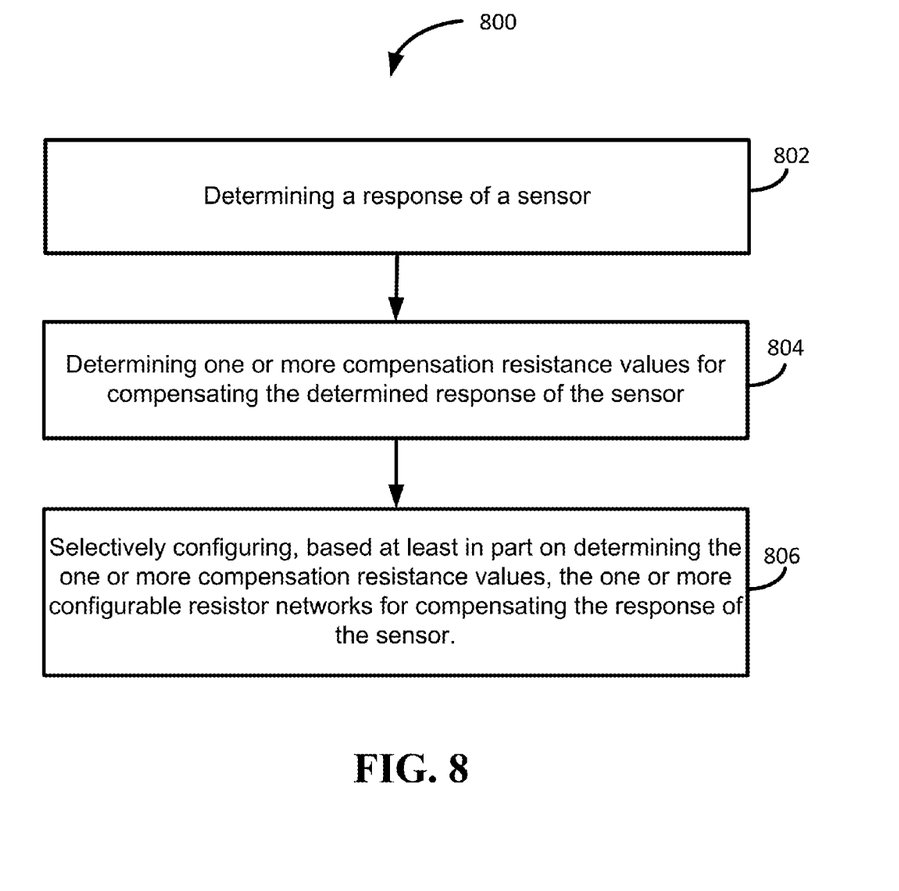
FIG. 8 is a flow-diagram of a method, according to an example implementation of the disclosed technology.

FIG. 8 is a flow-diagram of a method 800, according to an example implementation of the disclosed technology. In block 802, the method 800 includes determining a response of a sensor. In block 804, the method 800 includes determining one or more compensation resistance values for compensating the determined response of the sensor. In block 806, the method 800 includes selectively configuring, based at least in part on determining the one or more compensation resistance values, the one or more configurable resistor networks for compensating the response of the sensor.

Certain example implementations include mechanically packaging the configurable resistor network with the sensor.

According to an example implementation of the disclosed technology, selectively configuring the one or more configurable resistor networks includes opening one or more preconfigured series or parallel shorts associated with one or more resistors in the configurable resistor network.

In certain example implementations, selectively configuring the one or more configurable resistor networks can include laser trimming one or more resistors in the configurable resistor network.

In certain example implementations, the sensor is a pressure sensor. In other example implementations, the sensor is a temperature sensor. In yet other example implementations, the sensor may be a humidity sensor. Embodiments of the disclosure may include other environmental sensors. In certain example implementations, the sensor may include a Wheatstone bridge.

According to an example implementation of the disclosed technology, the characterizing of the sensor and/or determining the response of the sensor may be performed during operation of the sensor. In certain example implementations, determining the response of the sensor may be performed under specific test conditions.

Disclosed herein is compensation system that may include a sensor, one or more input terminals in communication with the sensor and configured for connecting to an input voltage source, one or more output terminals in communication with the sensor and configured for providing an output signal, and one or more configurable resistor networks in communication with one or more of the input and output terminals. The one or more configurable resistor networks may include one or more resistors configured to provide a compensation resistance value to compensate for a response of the sensor.

In certain example implementations, the one or more configurable resistor networks may be packaged with the sensor. In accordance with an example implementation of the disclosed technology, the one or more configurable resistor networks include one or more pre-configured series or parallel selectively configurable shorts associated with one or more resistors in the configurable resistor network, wherein one or more of the selectively configurable shorts are selectively opened to provide a compensation resistance value.

In certain example implementations, the one or more configurable resistor networks can include one or more laser trimmable resistors.

In certain example implementations, the temperature response of the sensor may be characterized during operation of the sensor under specific test conditions.

In an example implementation, one or more resistors in the configurable resistor network may be a low-temperature coefficient (low-TC) resistor.

In accordance with an example implementation of the disclosed technology, the one or more resistor networks of the compensation system can include one or more of a first resistor network operationally coupled to the sensor and a first lead of the one or more input terminals, a second resistor network operationally coupled to the sensor and first lead of the one or more output terminals, a third resistor network operationally coupled to the sensor and a second lead of the one or more input terminals, and a fourth resistor network operationally coupled to the sensor and a second lead of the one or more output terminals.

In certain example implementations, the sensor includes one or more piezoresistors.

In certain example implementations, the one or more resistors may be configured to provide a compensation resistance value to compensate for one or more of temperature, humidity, and pressure.

According to an example implementation of the disclosed technology, the one or more resistor networks comprise an array of low-TC resistors mounted on a ceramic substrate.

According to an example implementation of the disclosed technology, the one or more configurable resistor networks may be packaged with the sensor, and the package may include a window or port configured for optically and/or physically accessing the one or more configurable resistor networks and that allow for selectively configuring the one or more configurable resistor networks.

It is important to recognize that it is impractical to describe every conceivable combination of components or methodologies for purposes of describing the claimed subject matter. However, a person having ordinary skill in the art will recognize that many further combinations and permutations of the subject technology are possible. Accordingly, the claimed subject matter is intended to cover all such alterations, modifications, and variations that are within the spirit and scope of the claimed subject matter.

Throughout the specification and the claims, the following terms take at least the meanings explicitly associated herein, unless the context clearly dictates otherwise. The term "connect," "connecting," and "connected" mean that one function, feature, structure, or characteristic is directly joined to or in communication with another function, feature, structure, or characteristic. The term "couple," "coupling," and "coupled" mean that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

As disclosed herein, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

Although this disclosure describes specific examples, embodiments, and the like, various modifications and changes may be made without departing from the scope of the disclosed technology, as set forth in the claims below. For example, although the example methods, devices and systems, described herein are in conjunction with compensation of a sensor, the skilled artisan will readily recognize that the example methods, devices or systems may be used in other methods, devices or systems and may be configured to correspond to such other example methods, devices or systems as needed. Further, while at least one example, embodiment, or the like has been presented in the detailed description, many variations exist. Accordingly, the specification and figures are to be regarded in an illustrative rather than a restrictive sense, and all such modifications are intended to be included within the scope of the present disclosure. Any benefits, advantages, or solutions to problems that are described herein with regard to specific embodiments or examples are not intended to be construed as a critical, required, or essential feature or element of any or all of the claims.

We claim:

1. A method, comprising:
   determining a response of a sensor, wherein the sensor is coupled to:
   one or more input terminals configured for connecting to an input voltage source;
   one or more configurable resistor networks; and
   one or more output terminals configured for providing an output signal;
   determining one or more compensation resistance values for compensating the determined response of the sensor;
   selectively configuring, based at least in part on determining the one or more compensation resistance values, the one or more configurable resistor networks for compensating the response of the sensor, wherein selectively configuring the one or more configurable resistor networks comprises opening one or more series or parallel shorts associated with one or more resistors in the configurable resistor network.

2. The method of claim 1, further comprising mechanically packaging the configurable resistor network with the sensor.

3. The method of claim 1, wherein selectively configuring the one or more configurable resistor networks comprises laser trimming one or more resistors in the configurable resistor network.

4. The method of claim 1, wherein the sensor is a pressure sensor.

5. The method of claim 1, wherein determining the response of the sensor is performed during operation of the sensor.

6. The method of claim 1, wherein determining the response of the sensor is performed under specific test conditions.

7. The method of claim 1, wherein in the sensor comprises a Wheatstone bridge.

8. A compensation system, comprising:
   a sensor;
   one or more input terminals in communication with the sensor and configured for connecting to an input voltage source;
   one or more output terminals in communication with the sensor and configured for providing an output signal; and
   one or more configurable resistor networks in communication with one or more of the input and output terminals, the one or more configurable resistor networks comprising:
   one or more resistors configured to provide a compensation resistance value to compensate for a response of the sensor, and
   one or more series or parallel configurable shorts associated with the one or more resistors in the configurable resistor network.

9. The compensation system of claim 8, wherein the one or more configurable resistor networks are packaged with the sensor.

10. The compensation system of claim 8, wherein one or more of the configurable shorts are opened to provide a compensation resistance value.

11. The compensation system of claim 8, wherein the one or more configurable resistor networks comprise one or more laser trimmable resistors.

12. The compensation system of claim 8, wherein the sensor is a pressure sensor.

13. The compensation system of claim 8, wherein the temperature response of the sensor is characterized during operation of the sensor under specific test conditions.

14. The compensation system of claim 8, wherein in the sensor comprises a Wheatstone bridge.

15. The compensation system of claim 8, wherein the at least one of the one or more resistors in the configurable resistor network is a low-temperature coefficient (low-TC) resistor.

16. The compensation system of claim 8, wherein the one or more resistor networks comprise one or more of:
    a first resistor network operationally coupled to the sensor and a first lead of the one or more input terminals;
    a second resistor network operationally coupled to the sensor and first lead of the one or more output terminals;
    a third resistor network operationally coupled to the sensor and a second lead of the one or more input terminals; and
    a fourth resistor network operationally coupled to the sensor and a second lead of the one or more output terminals.

17. The compensation system of claim 8, wherein the sensor comprises at least one piezoresistor.

18. The compensation system of claim 8, wherein the one or more resistors are configured to provide a compensation resistance value to compensate one or more of temperature, humidity, and pressure.

19. The compensation system of claim 8, wherein the one or more resistor networks comprise an array of low-TC resistors mounted on a ceramic substrate.

20. The compensation system of claim 8, wherein the one or more configurable resistor networks are packaged with the sensor, and wherein the package includes a window or port configured for selectively configuring the one or more configurable resistor networks.

* * * * *